United States Patent [19]

Rhoton

[11] Patent Number: 4,656,950

[45] Date of Patent: Apr. 14, 1987

[54] TRANSIT VEHICLE DOOR CONTROL APPARATUS

[75] Inventor: Richard S. Rhoton, Mt. Lebanon, Pa.

[73] Assignee: Westinghouse Electric Corp., Pittsburgh, Pa.

[21] Appl. No.: 750,945

[22] Filed: Jul. 1, 1985

[51] Int. Cl.[4] .................... B60N 5/00

[52] U.S. Cl. .................... 105/341; 49/262

[58] Field of Search .................... 49/262; 104/27, 28, 104/30; 105/341; 246/125-127, 187 R, 249; 364/424

[56] References Cited

U.S. PATENT DOCUMENTS

| | | | |
|---|---|---|---|
| 1,191,968 | 7/1916 | Hedley et al. | 105/341 |
| 1,527,411 | 2/1925 | Hedley et al. | 105/341 |
| 2,981,869 | 4/1961 | Balint . | |
| 3,160,793 | 12/1964 | Colburn et al. . | |
| 3,561,160 | 2/1971 | Chan | 105/341 |
| 3,782,034 | 1/1974 | Lynn et al. | 105/341 |
| 4,023,753 | 5/1977 | Dobler | 246/5 |
| 4,168,770 | 9/1979 | Segar et al. | 191/57 |
| 4,491,917 | 1/1985 | Higgins et al. | 364/424 |
| 4,551,944 | 11/1985 | Donaldson | 49/262 |

FOREIGN PATENT DOCUMENTS

| | | | |
|---|---|---|---|
| 45024 | 4/1979 | Japan | 105/341 |

*Primary Examiner*—Robert B. Reeves
*Assistant Examiner*—Dennis C. Rodgers
*Attorney, Agent, or Firm*—J. L. Brzuszek

[57] ABSTRACT

A door control apparatus is provided for a transit vehicle for sensing the location of a predetermined power rail in relation to a safety walkway provided along the roadway path for controlling the passenger exit from the vehicle to that walkway.

5 Claims, 6 Drawing Figures

TRANSIT VEHICLE DOOR CONTROL APPARATUS

BACKGROUND OF THE INVENTION

It is known in prior art to provide a transit vehicle operative with a roadway track including power collection apparatus coupled with power rails extending along the longitudinal direction of the track as shown by U.S. Pat. No. 4,168,770 of W. R. Segar et al.

SUMMARY OF THE INVENTION

For an unmanned transit vehicle it is required that passenger doors on the side of the roadway track that does not include a safety walkway be controlled to prevent manual operation of those doors for the purpose of passenger exit from the transit vehicle. The power collector rail arrangement is correlated with the location of the safety walkway and the power collected from a predetermined power rail is determined for controlling the operation of the passenger doors.

DESCRIPTION OF A PREFERRED EMBODIMENT

Figure 1:
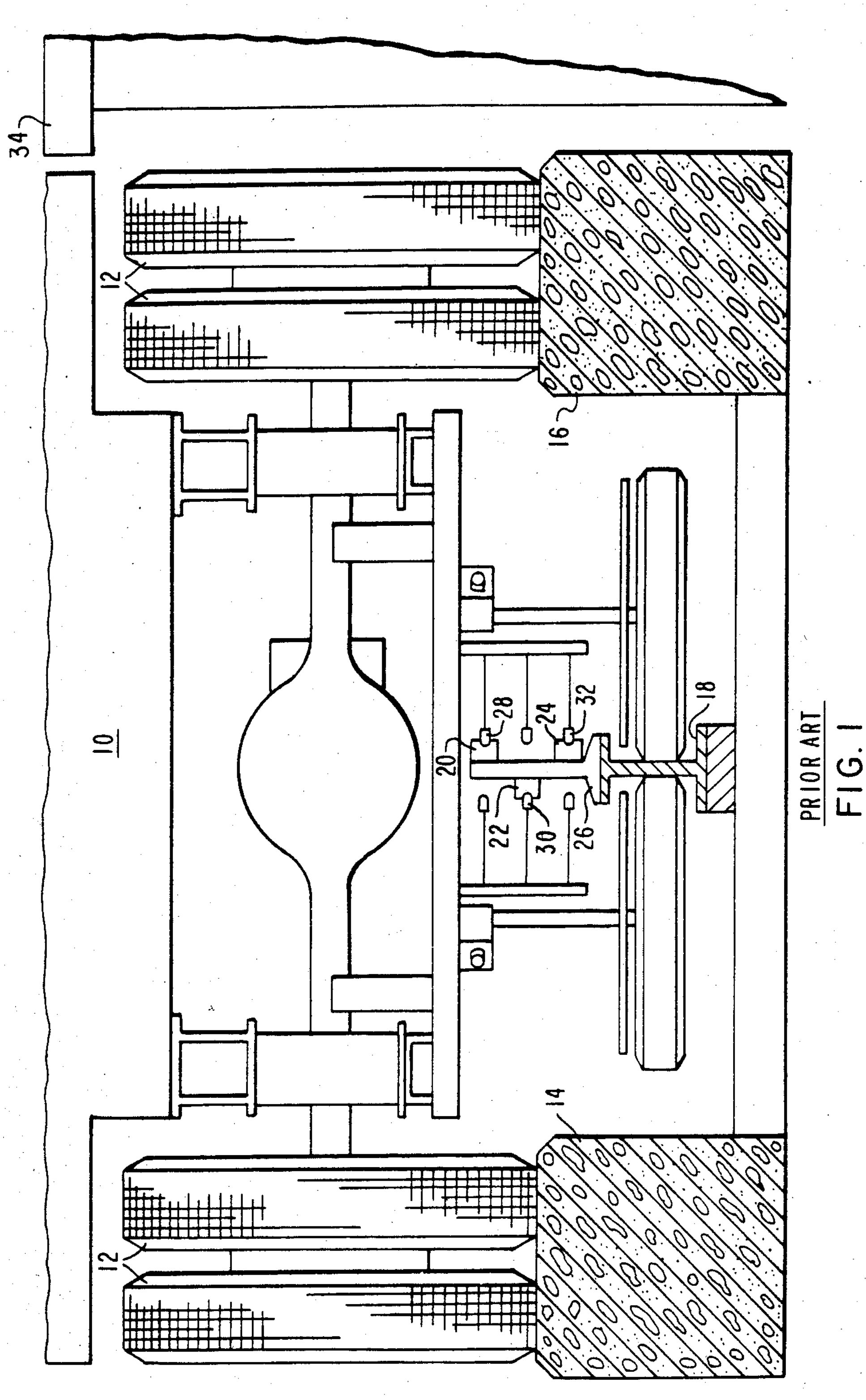
PRIOR ART FIG. 1
FIG. 1 shows a prior art transit vehicle power collection apparatus operative with the track power rails.

In FIG. 1 there is shown a transit vehicle 10 including support rails 12 operative with a roadway track including parallel track members 14 and 16 and a guide beam 18 included as part of the roadway. Power rails 20, 22 and 24 are carried by a support member 26 mounted on the top of the guide beam 18. The power rails 20, 22 and 24 are positioned in a triangular arrangement providing connection to the three phases of a three phase alternating power signal. A power collector 28 carried by the vehicle 10 is operative with the power rail 20. A power collector 30 carried by the vehicle 10 is operative with the power rail 22. A power collector 32 carried by the vehicle 10 is operative with the power rail 24. A safety walkway 34 is provided alongside of the path of the transit vehicle 10 in the event that it is desired that passengers exit from the vehicle 10 onto the safety walkway 34.

Transportation systems employing at least one self-propelled rubber tired vehicle traversing a roadway comprising spaced parallel tracks are well known in the prior art and generally described in U.S. Pat. No. 3,312,180 of E. O. Mueller.

Figure 2:
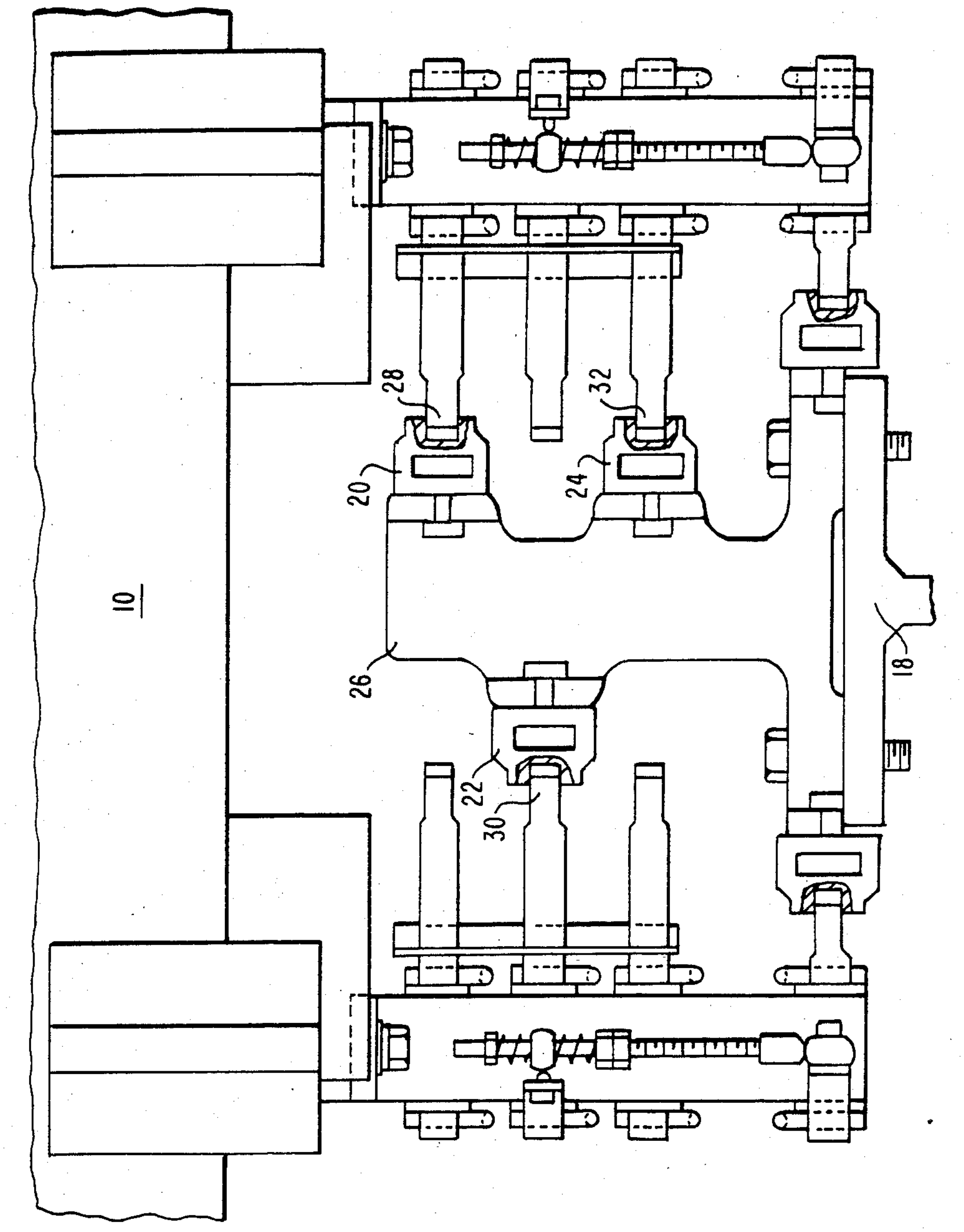
PRIOR ART FIG. 2
FIG. 2 shows a prior art power collection apparatus for a transit vehicle.

In FIG. 2 there is shown a prior art power collection apparatus for a transit vehicle including the power rails 20, 22 and 24 operative with power collectors 28, 30 and 32 which power collectors are carried by the transit vehicle 10. The power rails 20, 22 and 24 are carried by a support member 26 coupled with the top of the guide beam 18.

Figure 3:
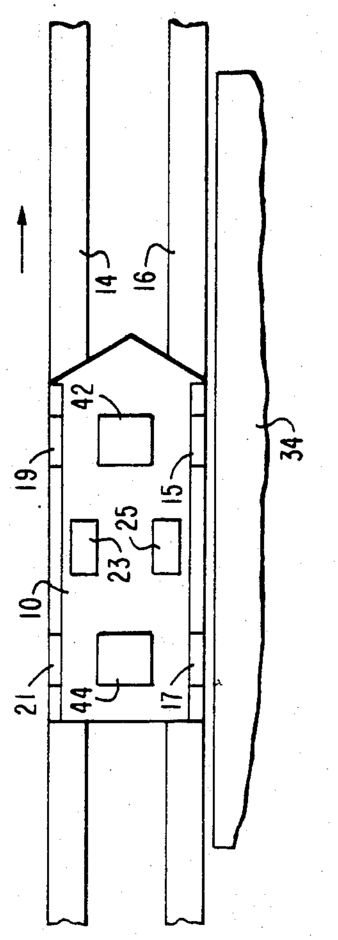
PRIOR ART FIG. 3
FIG. 3 shows a prior art arrangement of a safety walkway provided alongside of a transit vehicle operative with a roadway track.

In FIG. 3 there is shown a prior art arrangement of a safety walkway 34 provided alongside of the roadway track including the parallel vehicle support members 14 and 16 with the vehicle 10 shown operative with the roadway track. The front power collector apparatus 42 and the rear power collector apparatus 44 each comprise an arrangement of power collectors such as shown in FIG. 1 and FIG. 2. With the vehicle moving in the direction of the arrow 13, the right side doors 15 and 17 would normally be unlocked and the left side doors 19 and 21 would normally remain locked. For normal vehicle operation, only one door side is unlocked at a given time. Suitable left door lock control apparatus 23 and right door lock control apparatus 25 are provided.

Figure 4:
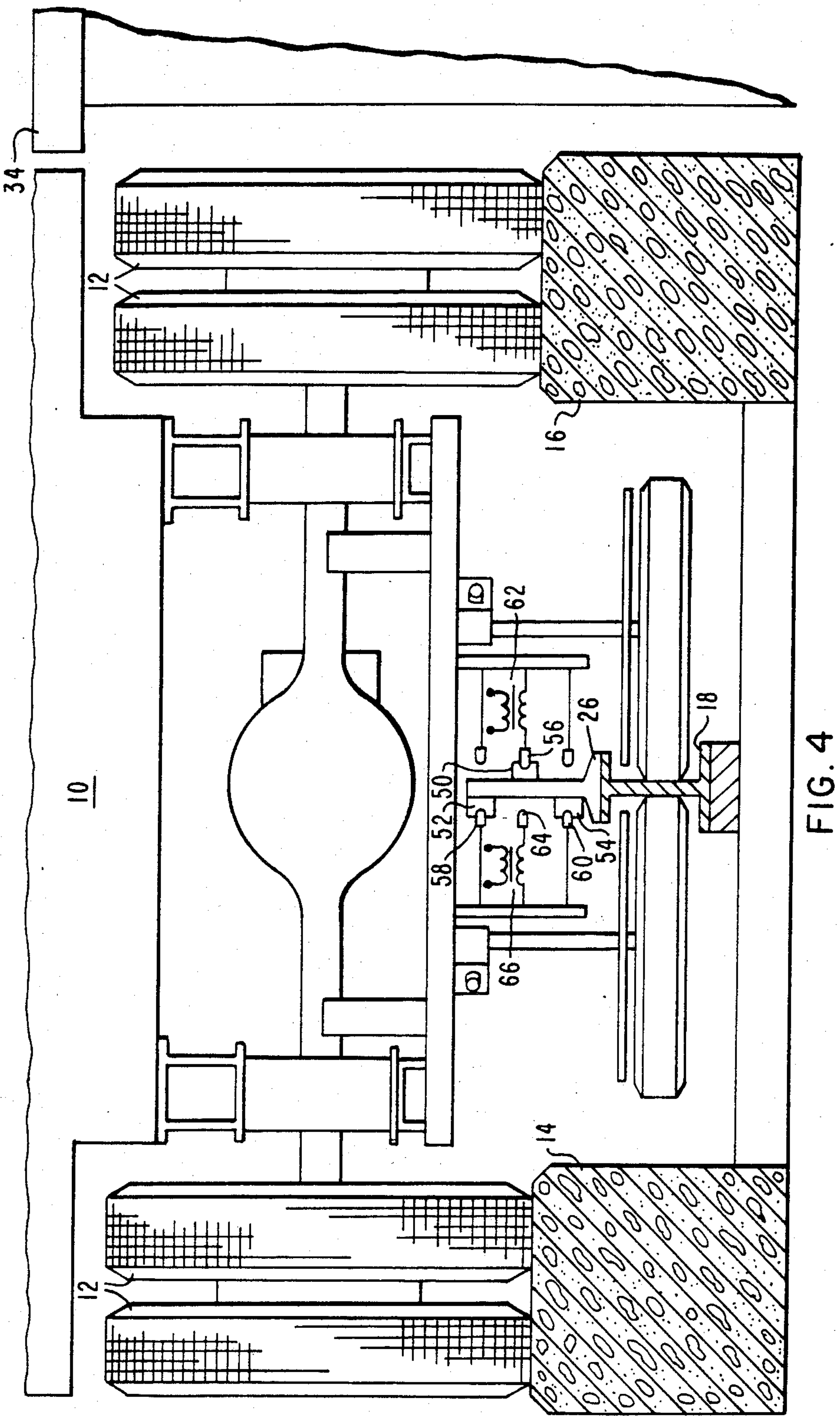
FIG. 4 shows the power rail arrangement in relation to a safety walkway in accordance with the present invention.

In FIG. 4 there is shown the power rail arrangement in relation to a safety walkway in accordance with the present invention whereby the vehicle 10 includes the support wheels 12 operative with the roadway track members 14 and 16. The vehicle 10 is guided by a central guide beam 18 on top of which is provided a support member 26 for power rails 50, 52 and 54. A power collector 56 is operative with the power rail 50, a power collector 58 is operative with the power rail 52 and a power collector 60 is operative with power rail 54. The power rail 50 which is the single power rail on a side of the support member 26 is positioned to correspond with the location of the safety walkway 34 provided for passengers leaving and entering the transit vehicle 10. The power collector 56 is operative with a current sensor 62 and the power collector 64 is operative with a current sensor 66. It should be noted that the power collector 64 is not operative with a power rail in the arrangement shown in FIG. 4. However, should the transit vehicle turn around for travel in the opposite direction, then the power collector 64 would become operative with the power rail 50. In the arrangement shown in FIG. 4 the power collector 56 receives current from the power rail 50 which is passed to the propulsion motor and other loads on the vehicle 10 and the current sensor 62 would provide a signal to indicate that the power collector 56 is operative with the power rail 50 and therefore the side of the vehicle corresponding to the power collector 56 is the side on which the passenger doors are controlled to permit the passengers to exit from the transit vehicle 10.

Figure 5:
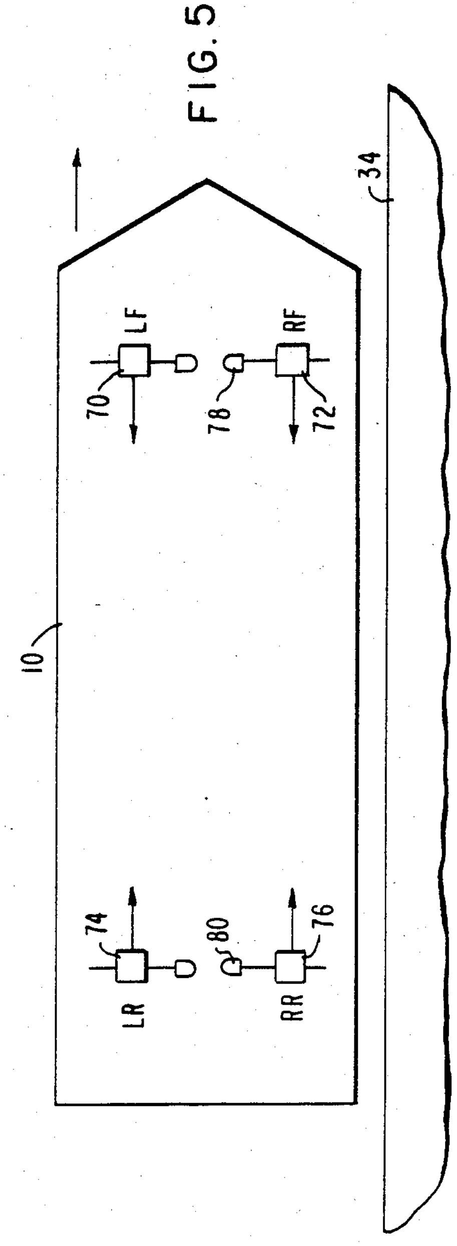
FIG. 5 shows the power collectors of a transit vehicle including current sensors operative in accordance with the present invention.

In FIG. 5 there is shown the power collectors of a transit vehicle including current sensors in accordance with the present invention such that for a vehicle traveling in the direction of the arrow there is provided a left front current sensor 70 and a right front current sensor 72, there is provided a left rear current sensor 74 and a right rear current sensor 76. For the relationship as shown in FIG. 4 since the power rail 50 is positioned on the same side of the roadway track as is the safety walkway 34, the right front current sensor 72 operative with the power collector 78 and the right rear current sensor 76 operative with the power collector 80 would provide control signals to indicate that the safety walkway 34 is positioned at the same side of the vehicle 10 as are signals provided for current sensors 72 and 76.

Unmanned passenger vehicle doors require prevention of manual operation by vehicle passengers on a roadway track side which does not have a safety walkway by coordinating the power rail configuration with the safety walkway location the vehicle can safely determine the side of the car on which the safety walkway is located and can thereby control the passenger doors to be manually opened only on the vehicle side where the safety walkway is positioned.

Unmanned transit vehicles require that the passengers be prevented from manually opening doors, for example, in an emergency which are not on the same side of the vehicle as the track emergency walkway. It is not economical to provide emergency walkways on both sides of the roadway track. Thus a control apparatus is desired which indicates to the transit vehicle in a safe manner on which side of the vehicle the emergency walkway is located. The provided door control apparatus should operate safely in relation to turn around operation of trained vehicles or normal operation of the transit vehicles in a reverse direction, reverse loop operation of the vehicles and the safety walkway being on different sides in relation to architectural constraints.

If the power rail arrangement is determined in relation to the location of the safety walkway the vehicle can sense the propulsion rail orientation and determine where the walkway is positioned. The signals provided by the current sensors can be used to drive a cross connected latch circuit on the door lock mechanism such that one side of the passenger vehicle is always unlocked and under loss of power a battery source can be provided to lock the doors of the undesired vehicle side for a limited time period and under failure conditions both sides can be unlocked and this condition indicated by a suitable alarm.

When the transit vehicle is not drawing propulsion power it is always drawing some kind of auxiliary power which is enough to cause the current sensors to provide a suitable control signal. If the transit vehicle is not drawing any power at all the doors on both sides of the vehicle can be opened after a predetermined time period such as ten seconds. The auxiliary power is in the order of 10 to 20 kilowatts of power which is adequate to provide a safe detection of the location of the safety walkway.

Figure 6:
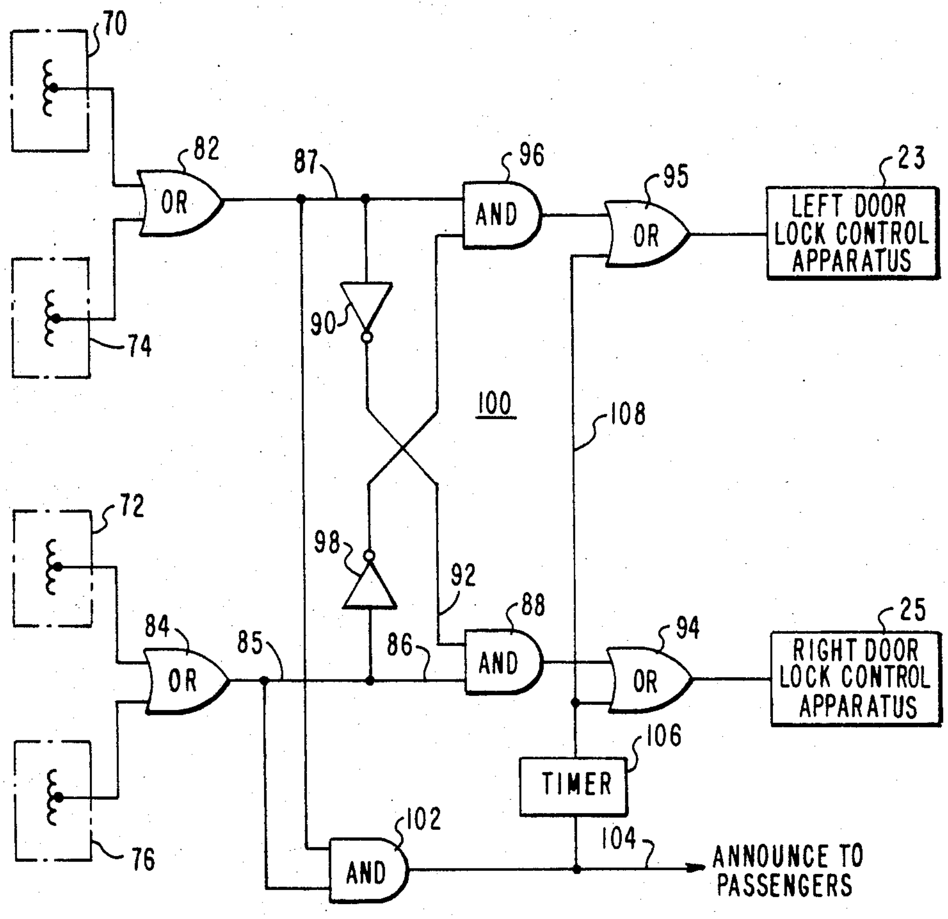
FIG. 6 shows a transit vehicle passenger door control apparatus in accordance with the present invention.

FIG. 6 shows a transit vehicle passenger door control apparatus in accordance with the present invention and including the left front current sensor 70, which could be a current transformer, the right front current sensor 72, the left rear current sensor 74 and the right rear current sensor 76. For the vehicle operation with the safety walkway 34 positioned as shown in FIG. 5, the right front current sensor 72 and the right rear current sensor 76 will sense current from the power rail 50 and provide output signals to the OR circuit 84, which will output a right door unlock request signal 85 to energize input 86 of the AND circuit 88. The left front current sensor 70 and the right front current sensor 74, with the walkway 34 positioned as shown in FIG. 5, do not sense current from a power rail and no output signals are provided to the OR circuit 82, which does not provide a left door unlock request signal 87. The output signal 85 from the OR circuit 84 indicates that the right vehicle doors are requested to be unlocked. Since the left door unlock request signal 87 is not provided, the inverter 90 provides an output signal to energize the second input 92 of the AND circuit 88, such that the AND circuit 88 provides an output through the OR circuit 94 to provide an indication to the right door lock control apparatus 25 to unlock the right side vehicle doors. The AND circuits 88 and 96 coupled with the inverters 90 and 98 operate as a flip-flop circuit 100, such that the output signal 85 causes the AND circuit 88 to provide an output and operates through the inverter 98 to prevent the AND circuit 96 from providing an output. In this way when the unlock right door request signal 85 indicates to the right door lock control apparatus 25 to unlock the right vehicle doors, there is not a similar operation to unlock the left vehicle doors due to the function of the flip-flop circuit 100, such that only one unlock door operation is thereby provided during normal vehicle operation. The output signal 85 from the OR circuit 84 and the output signal 87 from the OR circuit 82 are operative with the AND circuit 102 to provide the signal 104 for indicating when the vehicle is not receiving power as sensed by any of the current sensors 70, 72, 74 and 76. After a time delay provided by timer 106, all of the doors of the vehicle are unlocked by the signal 108 and an announcement of this condition is given to the vehicle passengers by the signal 104.

I claim:

1. In control apparatus for a transit vehicle having a first passenger door and having a second passenger door located at respectively opposite sides of the vehicle, said vehicle being operative to move along a roadway track having a safety walkway at one side of the track and having a predetermined power rail positioned on the same side of the track, the combination of:

first collector means carried by the vehicle when traveling in a first direction for operation with the power rail and including first signal means, second collector means carried by the vehicle when traveling in a second direction for operation with the power rail and including second signal means, door control means for controlling the locked condition of said first and second passenger doors, said door control means including latch means for providing that said first and said second passenger doors are alternatively unlocked, except under failure conditions for which doors on both sides of the vehicle are unlocked after a limited time period, with the first signal means sensing current from the power rail when the first collector means is operative with said power rail and providing a first control signal to the door control means for locking one of the first and second passenger doors, and with the second signal means sensing current from the power rail when the second collector means is operative with said power rail and providing a second control signal to the door control means for locking the other of the first and second passenger doors.

2. The control apparatus of claim 1, with each of the first and second signal means operating to sense current flow from the power rail to the vehicle for providing the respective first and second control signals.

3. The control apparatus of claim 1, with the provided control signal to the door control means being operative to lock the passenger door of the transit vehicle which is on the side of the roadway track not having a safety walkway.

4. The control apparatus of clam 1, with the one signal means providing a control signal to indicate that the collector means associated with that one signal means is operative with the power rail and to indicate the side of the vehicle on which the passenger door is not locked to permit passengers to exit from the vehicle.

5. The control apparatus of claim 1, with the first signal means including a first current sensor to provide the control signal, and with the second signal means including a second current sensor to provide the second control signal.

* * * * *